United States Patent
Gschwind et al.

(10) Patent No.: US 10,372,457 B2
(45) Date of Patent: *Aug. 6, 2019

(54) EFFECTIVENESS AND PRIORITIZATION OF PREFETCHES

(71) Applicant: INTERNATIONAL BUSINESS MACHINES CORPORATION, Armonk, NY (US)

(72) Inventors: Michael K. Gschwind, Chappaqua, NY (US); Christian Jacobi, Poughkeepsie, NY (US); Anthony Saporito, Highland, NY (US); Chung-Lung K. Shum, Wappinger Falls, NY (US)

(73) Assignee: international Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/802,725

(22) Filed: Nov. 3, 2017

(65) Prior Publication Data

US 2018/0074826 A1    Mar. 15, 2018

Related U.S. Application Data

(63) Continuation of application No. 15/194,869, filed on Jun. 28, 2016.

(51) Int. Cl.
*G06F 9/30* (2018.01)
*G06F 9/38* (2018.01)
(Continued)

(52) U.S. Cl.
CPC ........ *G06F 9/3802* (2013.01); *G06F 9/30047* (2013.01); *G06F 12/0862* (2013.01);
(Continued)

(58) Field of Classification Search
None
See application file for complete search history.

(56) References Cited

U.S. PATENT DOCUMENTS 6,055,621 A * 4/2000 Puzak ............... G06F 9/3802
712/207
7,603,672 B1 * 10/2009 Andrighetti ......... G06F 9/30047
710/23

(Continued)

FOREIGN PATENT DOCUMENTS

EP          1406174 A2    7/2004
WO    WO 03/083666 A1   10/2003

OTHER PUBLICATIONS

Peter Mell et al., "The NIST Definition of Cloud Computing", National Institute of Standards and Technology, U.S. Department of Commerce, NIST Special Publication 800-145, Sep. 2011, 7 pages.
(Continued)

*Primary Examiner* — John M Lindlof
(74) *Attorney, Agent, or Firm* — Heslin Rothenberg Farley & Mesiti P.C.; Steven Chiu, Esq.

(57) ABSTRACT

A method, system, and computer program product are provided for prioritizing prefetch instructions. The method includes a processor issuing a prefetch instruction and fetching elements from a cache that can include a memory or a higher level cache. The processor stores the elements in temporary storage and monitors for accesses by an instruction. The processor stores a record representing the prefetch instruction. The processor updates the record with an indicator and issues a new prefetch instruction by comparing the new prefetch instruction to the record, based on the new prefetch instruction matching the prefetch instruction, assigning the indicator to the new prefetch instruction as a priority value, based on the new prefetch instruction not matching the prefetch instruction, assigning a default value
(Continued)

to the new prefetch instruction as the priority value, and determining whether to execute the new prefetch instruction, based on the priority value of the new prefetch instruction.

7 Claims, 12 Drawing Sheets

(51) Int. Cl.
  *G06F 12/0875* (2016.01)
  *G06F 12/0862* (2016.01)
(52) U.S. Cl.
  CPC .. *G06F 12/0875* (2013.01); *G06F 2212/1016* (2013.01); *G06F 2212/452* (2013.01); *G06F 2212/6022* (2013.01); *G06F 2212/6028* (2013.01)

(56) References Cited

U.S. PATENT DOCUMENTS

| | | | |
|---|---|---|---|
| 7,917,702 B2 | 3/2011 | Morrow et al. | |
| 2007/0239940 A1 | 10/2007 | Doshi et al. | |
| 2009/0077350 A1 | 3/2009 | Saraswati et al. | |
| 2011/0138126 A1* | 6/2011 | Blundell | G06F 9/3004 711/125 |
| 2012/0084511 A1* | 4/2012 | Dooley | G06F 12/0862 711/122 |
| 2013/0179663 A1 | 7/2013 | Heisch | |
| 2014/0101413 A1 | 4/2014 | Hesich | |

OTHER PUBLICATIONS

Chen et al., "Global-Aware and Mult-Order Context-Based Prefetching for High-Performance Processors", The International Journal of High Performance Computing Applications 25 (4) 355-370.

Spracklen et al., "Effective Instruction Prefetching in Chip Multi-processors for Modern Commercial Applications", IEEE, 2005, 12 pages.

List of IBM Patents or Patent Applications Treated as Related, Nov. 3, 2017, 2 pages.

Gschwind, Michael K., "Effectiveness and Prioritization of Prefetches," U.S. Appl. No. 15/194,869, filed Jun. 28, 2016, pp. 1-63.

* cited by examiner

400

410

Program code issues a prefetch instruction.

420

Based on the prefetch instruction, the program code obtains element(s) from a cache and stores the elements in temporary storage

430

Program code stores a record representing the prefetch instruction.

440

Program code monitors the elements in the temporary storage.

450

Based on the temporary storage losing the element(s) before the element(s) are accessed by a demand instruction, the program code marks the record with an indicator.

460

Program code issues a new prefetch instruction and compares the new prefetch instruction to the record.

470

Based on the new prefetch instruction matching the prefetch instruction, the program code assigns the indicator to the new prefetch instruction.

FIG. 4

510 — Program code issues a prefetch instruction.

520 — Based on the prefetch instruction, the program code obtains element(s) from a cache and stores the elements in temporary storage

530 — Program code stores a record representing the prefetch instruction.

540 — Program code monitors the elements in the temporary storage, which includes counting and retaining the number of cycles since the program code issued the prefetch instruction and updating the record with the number of cycles.

550 — Program code obtains a demand fetch instruction and compares the demand fetch instruction to the prefetch instruction to determine if the instructions have the same operand address.

560 — Based on determining that the demand fetch instruction and the prefetch instruction have the same operand address, the program code updates the record.

570 — Program code issues a new prefetch instruction and compares the new prefetch instruction to the updated record.

580 — Program code program code assigns the new prefetch instruction a priority.

EFFECTIVENESS AND PRIORITIZATION OF PREFETCHES

BACKGROUND

One or more aspects relate, in general, to multiprocessing computing environments, and in particular, to transactional processing within such computing environments, which include prefetching instructions.

In general, prefetching refers to the transfer of data from a main memory to temporary storage, in readiness for later use. In certain computer architectures, instruction prefetch is a technique used in microprocessors to speed up the execution of a program by reducing wait states. Because processors can be faster than the memory where program code is stored, meaning that the program's instructions and/or the instruction operands cannot be read fast enough to keep the processor busy, adding a cache can provide faster access to needed instructions and the data utilized by the instructions, and therefore, maximize the efficiency of the processor. Prefetching occurs when a processor requests an instruction from main memory before it is actually needed. Once the instruction comes back from memory, it is placed in a cache. When an instruction is needed, the instruction can be accessed much more quickly from the cache, than if the processor had to make a request for the instruction from memory.

In some computer architecture, although the processors employ a prefetch technique to cache instructions before they are needed, prefetch data instructions may instruct a processor (including one or more processor in a central processing unit (CPU)) to perform a cache prefetch for a particular address. However, the program code executed by the processor in these systems does not check whether prefetching the instructions actually impacted the efficiency of the system, e.g., there is no check for whether the prefetched data was actually used by the program. As a result, with limited resources, useful prefetches can be dropped in lieu of previously issued ineffective prefetches (i.e., instructions and/or data that are not utilized), leading to non-optimal performance of the system.

SUMMARY

Shortcomings of the prior art are overcome and additional advantages are provided through the provision of a computer program product for prioritizing prefetch instructions. The computer program product comprises a storage medium readable by a processing circuit and storing instructions for execution by the processing circuit for performing a method. The method includes, for instance: issuing, by a processor, a prefetch instruction; fetching, by the processor, based on the prefetch instruction, elements from a cache, wherein the cache comprises a memory or a higher level cache; storing, by the processor, the elements in a temporary storage and monitoring the elements for accesses by an instruction issued by the processor; storing, by the processor, a record representing the prefetch instruction; updating, by the processor, the record with an indicator; and issuing, by the processor, a new prefetch instruction, wherein the issuing comprises: comparing, by the processor, the new prefetch instruction to the record; based on the new prefetch instruction matching the prefetch instruction, assigning, by the processor, the indicator to the new prefetch instruction as a priority value of the new prefetch instruction; based on the new prefetch instruction not matching the prefetch instruction, assigning, by the processor, a default value to the new prefetch instruction as the priority value of the new prefetch instruction; and determining, by the processor, whether to execute the new prefetch instruction, based on the priority value of the new prefetch instruction.

Shortcomings of the prior art are overcome and additional advantages are provided through the provision of a method for prioritizing prefetch instructions. The method includes, for instance: issuing, by a processor, a prefetch instruction; fetching, by the processor, based on the prefetch instruction, elements from a cache, wherein the cache comprises a memory or a higher level cache; storing, by the processor, the elements in a temporary storage and monitoring the elements for accesses by an instruction issued by the processor; storing, by the processor, a record representing the prefetch instruction; updating, by the processor, the record with an indicator; and issuing, by the processor, a new prefetch instruction, wherein the issuing comprises: comparing, by the processor, the new prefetch instruction to the record; based on the new prefetch instruction matching the prefetch instruction, assigning, by the processor, the indicator to the new prefetch instruction as a priority value of the new prefetch instruction; based on the new prefetch instruction not matching the prefetch instruction, assigning, by the processor, a default value to the new prefetch instruction as the priority value of the new prefetch instruction; and determining, by the processor, whether to execute the new prefetch instruction, based on the priority value of the new prefetch instruction.

Shortcomings of the prior art are overcome and additional advantages are provided through the provision of a system for prioritizing prefetch instructions. The system includes a memory, one or more processor in communication with the memory, and program instructions executable by the one or more processor via the memory to perform a method. The method includes, for instance: issuing, by a processor, a prefetch instruction; fetching, by the processor, based on the prefetch instruction, elements from a cache, wherein the cache comprises the memory or a higher level cache; storing, by the processor, the elements in a temporary storage and monitoring the elements for accesses by an instruction issued by the processor; storing, by the processor, a record representing the prefetch instruction; updating, by the processor, the record with an indicator; and issuing, by the processor, a new prefetch instruction, wherein the issuing comprises: comparing, by the processor, the new prefetch instruction to the record; based on the new prefetch instruction matching the prefetch instruction, assigning, by the processor, the indicator to the new prefetch instruction as a priority value of the new prefetch instruction; based on the new prefetch instruction not matching the prefetch instruction, assigning, by the processor, a default value to the new prefetch instruction as the priority value of the new prefetch instruction; and determining, by the processor, whether to execute the new prefetch instruction, based on the priority value of the new prefetch instruction.

Methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects. For example, in an embodiment of the present invention, the updating the record with the indicator is based on one of: the temporary storage losing the elements before the elements are accessed by the instruction, or an address of the instruction matching an address of the prefetch instruction. In an embodiment of the present invention, the method may further include executing, by the processor, the new prefetch instruction, based on the determining indicating that the priority value is above a predefined threshold. In an embodiment of the present invention the storing the record representing the prefetch instruction further comprises indexing, by the processor, the record by an address of the prefetch instruction. In another embodiment of the present invention the storing the record representing the prefetch instruction includes: storing, by the processor, the record in a data structure wherein the data structure is one of: a dedicated data structure or a shared data structure. In an embodiment of the present invention the updating the record with the indicator is based on the address of the instruction matching the address of the prefetch instruction, and the indicator comprises a number of cycles from the issuing the prefetch instruction to issuing the instruction.

In certain embodiments of the present invention, the determining whether to execute the new prefetch instruction, based on the priority value of the new prefetch instruction, further includes: checking, by the processor, fetch control resources to determine if a fetch control resource is available to execute the new prefetch instruction; based on determining that the fetch control resources are not available, obtaining priority values of prefetch instructions in progress with the fetch control resources; identifying, by the processor, a prefetch instruction in progress of the prefetch instructions in progress with a lowest priority value and comparing the lowest priority value with the priority value of the new prefetch instruction; based on determining, by the processor, that the priority value of the new prefetch instruction is higher than the priority value of the identified prefetch instruction in progress, cancelling, by the processor, execution of the identified prefetch instruction; and determining, by the processor, whether to execute the new prefetch instruction, based on the priority value of the new prefetch instruction.

In an embodiment of the present invention, the method also includes: fetching, by the processor, based on the new prefetch instruction, new elements from the cache; storing, by the processor, the new elements in the temporary storage and monitoring the new elements for accesses by instructions issued by the processor; storing, by the processor, a new record representing the new prefetch instruction; and updating, by the processor, the new record with a new indicator. In some embodiments of the present invention the new indicator is based on one of: the temporary storage losing the new elements before the elements are accessed by at least one instruction, or an address of at least one instruction matching an address of the prefetch instruction.

In an embodiment of the present invention, the method further includes: issuing, by the processor, another prefetch instruction, wherein the issuing comprises: comparing, by the processor, the other prefetch instruction to the record and to the new record; based on the other prefetch instruction matching one of the prefetch instruction or the new prefetch instruction, assigning, by the processor, one of the indicator or the new indicator to the other prefetch instruction as a priority value of the other prefetch instruction; based on the other prefetch instruction not matching one of the prefetch instruction or the new prefetch instruction, assigning, by the processor, the default value to the other prefetch instruction as the priority value of the other prefetch instruction; and determining, by the processor, whether to execute the other prefetch instruction, based on the priority value of the other prefetch instruction.

BRIEF DESCRIPTION OF THE SEVERAL VIEWS OF THE DRAWINGS

One or more aspects are particularly pointed out and distinctly claimed as examples in the claims at the conclusion of the specification. The foregoing and other objects, features, and advantages are apparent from the following detailed description taken in conjunction with the accompanying drawings in which:

FIG. 4 is a workflow diagram depicting aspects of the present technique;

FIG. 5 is a workflow diagram depicting aspects of the present technique;

FIG. 6 depicts one embodiment of a cloud computing node;

DETAILED DESCRIPTION

Figure 1:
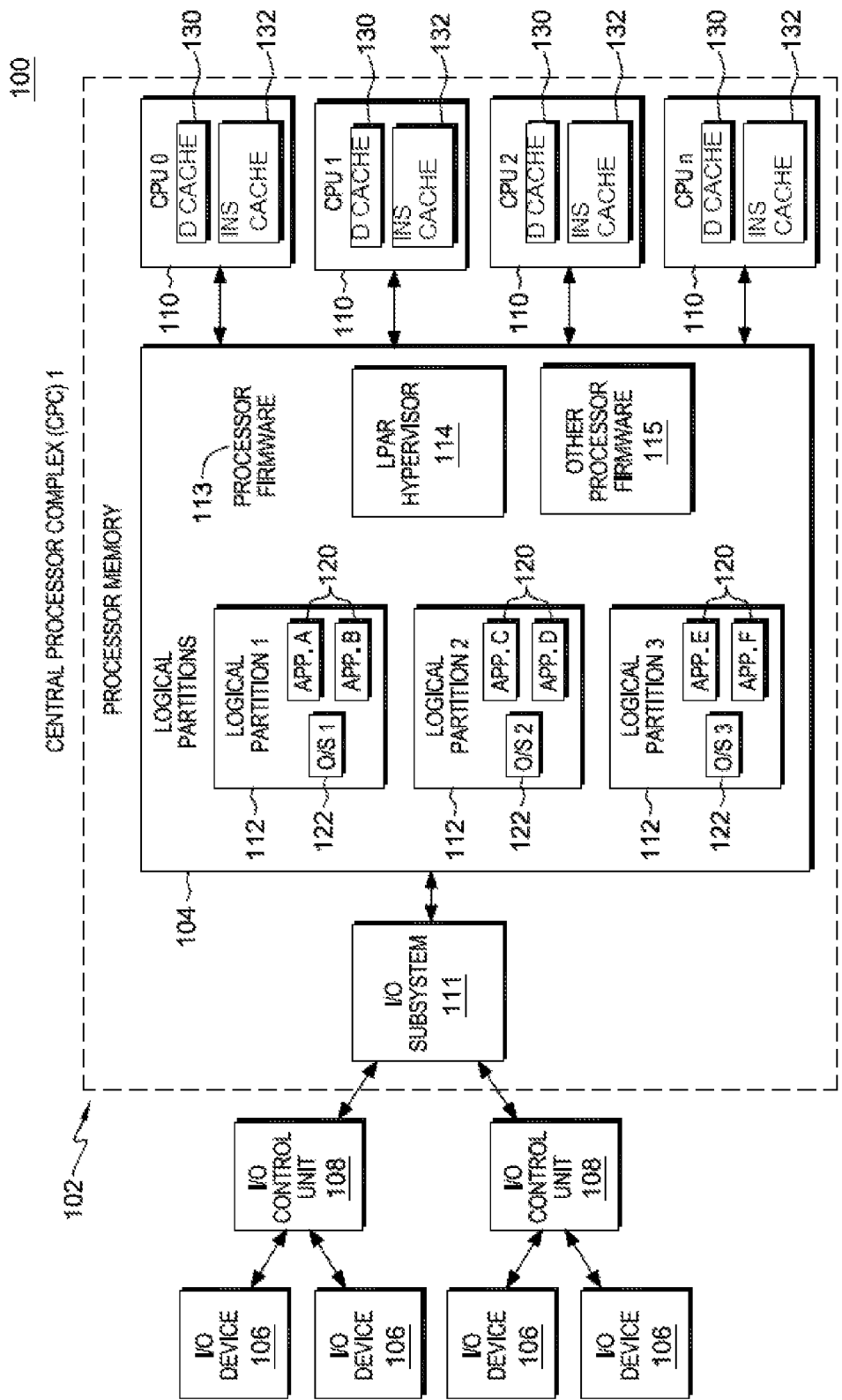
FIG. 1 depicts one embodiment of a computing environment.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. For example, in certain embodiments of the present invention, which are described below, software, which is sometimes traditionally understood as program code, may issue a prefetch instruction, while the remainder of the method described may be initiated by one or more processors in a computer system into which aspects of certain embodiments of the present invention are implemented. Thus, aspects of embodiments of the present invention performed by software and/or hardware are both described below are operations of the "program code" for the sake of consistency and comprehension.

In an embodiment of the present invention, program code, including program code executed by one or more processors in a CPU of a computer system, monitors prefetch activity, including but not limited to, tracking whether data that was prefetched by the program code was utilized by a processor, including by an instruction obtained by the processor. Because the space in a cache can be limited, in an embodiment of the present invention, if a cache a prefetched line exits a cache before it has been used by any instruction, the program code designates the prefetch instruction ineffective.

In an embodiment of the present invention, program code executed by a processor issues a prefetch instruction. The program code fetches, based on the prefetch instruction, elements from a cache, wherein the cache comprises a memory or a higher level cache.

The program code stores the elements in a temporary storage and monitors the elements for accesses by an instruction issued by the processor. The program code stores a record representing the prefetch instruction. The program code updates the record with an indicator and the program code issues a new prefetch instruction. In an embodiment of the present invention, when the program code issues the new prefetch instruction it compares the new prefetch instruction to the record. Based on the new prefetch instruction matching the prefetch instruction, the program code assigns the indicator to the new prefetch instruction as a priority value of the new prefetch instruction. Based on the new prefetch instruction not matching the prefetch instruction, the program code assigns a default value to the new prefetch instruction as the priority value of the new prefetch instruction. The program code determines whether to execute the new prefetch instruction, based on the priority value of the new prefetch instruction.

In an embodiment of the present invention, the program code updates the record with the indicator based on one of: the temporary storage losing the elements before the elements are accessed by the instruction, or an address of the instruction matching an address of the prefetch instruction.

In an embodiment of the present invention, the program code executes the new prefetch instruction, based on the determining indicating that the priority value is above a predefined threshold.

In an embodiment of the present invention, when the program code stores the record representing the prefetch instruction, the program code indexes the record by an address of the prefetch instruction.

In an embodiment of the present invention, when the program code stores the record representing the prefetch instruction comprises, the storing includes storing the record in a data structure wherein the data structure is one of: a dedicated data structure or a shared data structure.

In an embodiment of the present invention, where the program code updates the record with the indicator based on the address of the instruction matching the address of the prefetch instruction, the indicator includes a number of cycles from the issuing the prefetch instruction to issuing the instruction.

In an embodiment of the present invention, when the program code determined whether to execute the new prefetch instruction based on the priority value, this includes the program code checking fetch control resources to determine if a fetch control resource is available to execute the new prefetch instruction. Based on determining that the fetch control resources are not available, the program code obtains priority values of prefetch instructions in progress with the fetch control resources. The program code identifies a prefetch instruction in progress of the prefetch instructions in progress with a lowest priority value and compares the lowest priority value with the priority value of the new prefetch instruction. Based on the program code determining that the priority value of the new prefetch instruction is higher than the priority value of the identified prefetch instruction in progress, the program code cancels execution of the identified prefetch instruction and executes the new prefetch instruction.

In an embodiment of the present invention, the program code additionally fetches, based on the new prefetch instruction, new elements from the cache. The program code stores the new elements in the temporary storage and monitoring the new elements for accesses by instructions issued by the processor. The program code stores a new record representing the new prefetch instruction and the program code updates the new record with a new indicator.

In an embodiment of the present invention, the new indicator is based on one of: the temporary storage losing the new elements before the elements are accessed by at least one instruction, or an address of at least one instruction matching an address of the prefetch instruction.

In an embodiment of the present invention, the program code issues another prefetch instruction, where the issuing includes the program code comparing the other prefetch instruction to the record and to the new record. Based on the other prefetch instruction matching one of the prefetch instruction or the new prefetch instruction, the program code assigns one of the indicator or the new indicator to the other prefetch instruction as a priority value of the other prefetch instruction. Based on the other prefetch instruction not matching one of the prefetch instruction or the new prefetch instruction, assigning, by the processor, the default value to the other prefetch instruction as the priority value of the other prefetch instruction. The program code determines whether to execute the other prefetch instruction, based on the priority value of the other prefetch instruction.

Prior to describing the prefetch instruction monitoring by embodiments of the present invention in greater detail, details regarding the transactional execution facility, including prefetch instruction acquisition and caching, are discussed. The computer environment and mechanisms discussed below are examples of computing environments in which aspects of embodiments of the present invention may be implemented.

Referring to FIG. 1, in one example, a computing environment 100 is based on the z/Architecture, offered by International Business Machines (IBM®) Corporation, Armonk, N.Y. The z/Architecture is described in an IBM Publication entitled "z/Architecture—Principles of Operation," Publication No. SA22-7932-09, $10^{th}$ Edition, September 2012, which is hereby incorporated by reference herein in its entirety.

Z/ARCHITECTURE, IBM, and Z/OS and Z/VM (referenced below) are registered trademarks of International Business Machines Corporation, Armonk, N.Y. Other names used herein may be registered trademarks, trademarks or product names of International Business Machines Corporation or other companies.

As one example, computing environment 100 includes a central processor complex (CPC) 102 coupled to one or more input/output (I/O) devices 106 via one or more control units 108. Central processor complex 102 includes, for instance, a processor memory 104 (a.k.a., main memory, main storage, central storage) coupled to one or more central processors (a.k.a., central processing units (CPUs)) 110, and an input/output subsystem 111, each of which is described below. As aforementioned, in an embodiment of the present invention, the CPU, comprised of one or more central processors 110, tracks prefetches, including and whether the data that was prefetched is being used by the CPU.

Processor memory 104 includes, for example, one or more partitions 112 (e.g., logical partitions), and processor firmware 113, which includes a logical partition hypervisor 114 and other processor firmware 115. One example of logical partition hypervisor 114 is the Processor Resource/System Manager (PRISM), offered by International Business Machines Corporation, Armonk, N.Y.

A logical partition functions as a separate system and has one or more applications 120, and optionally, a resident operating system 122 therein, which may differ for each logical partition. In one embodiment, the operating system is the z/OS operating system, the z/VM operating system, the z/Linux operating system, or the TPF operating system, offered by International Business Machines Corporation, Armonk, N.Y. Logical partitions 112 are managed by logical partition hypervisor 114, which is implemented by firmware running on processors 110. As used herein, firmware includes, e.g., the microcode and/or millicode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

Central processors 110 are physical processor resources allocated to the logical partitions. In particular, each logical partition 112 has one or more logical processors, each of which represents all or a share of a physical processor 110 allocated to the partition. The logical processors of a particular partition 112 may be either dedicated to the partition, so that the underlying processor resource 110 is reserved for that partition; or shared with another partition, so that the underlying processor resource is potentially available to another partition. In one example, one or more of the CPUs include aspects of the data cache 130 and the instruction cache 132 described herein. As will be discussed herein, one or more of the data cache 130 and the instruction cache 132 are relevant to the prefetch instructions.

Input/output subsystem 111 directs the flow of information between input/output devices 106 and main storage 104. It is coupled to the central processing complex, in that it can be a part of the central processing complex or separate therefrom. The I/O subsystem relieves the central processors of the task of communicating directly with the input/output devices and permits data processing to proceed concurrently with input/output processing. To provide communications, the I/O subsystem employs I/O communications adapters. There are various types of communications adapters including, for instance, channels, I/O adapters, PCI cards, Ethernet cards, Small Computer Storage Interface (SCSI) cards, etc. In the particular example described herein, the I/O communications adapters are channels, and therefore, the I/O subsystem is referred to herein as a channel subsystem. However, this is only one example. Other types of I/O subsystems can be used.

The I/O subsystem uses one or more input/output paths as communication links in managing the flow of information to or from input/output devices 106. In this particular example, these paths are called channel paths, since the communication adapters are channels.

The computing environment described above is only one example of a computing environment that can be used. Other environments, including but not limited to, non-partitioned environments, other partitioned environments, and/or emulated environments, may be used; embodiments are not limited to any one environment.

Figure 2:
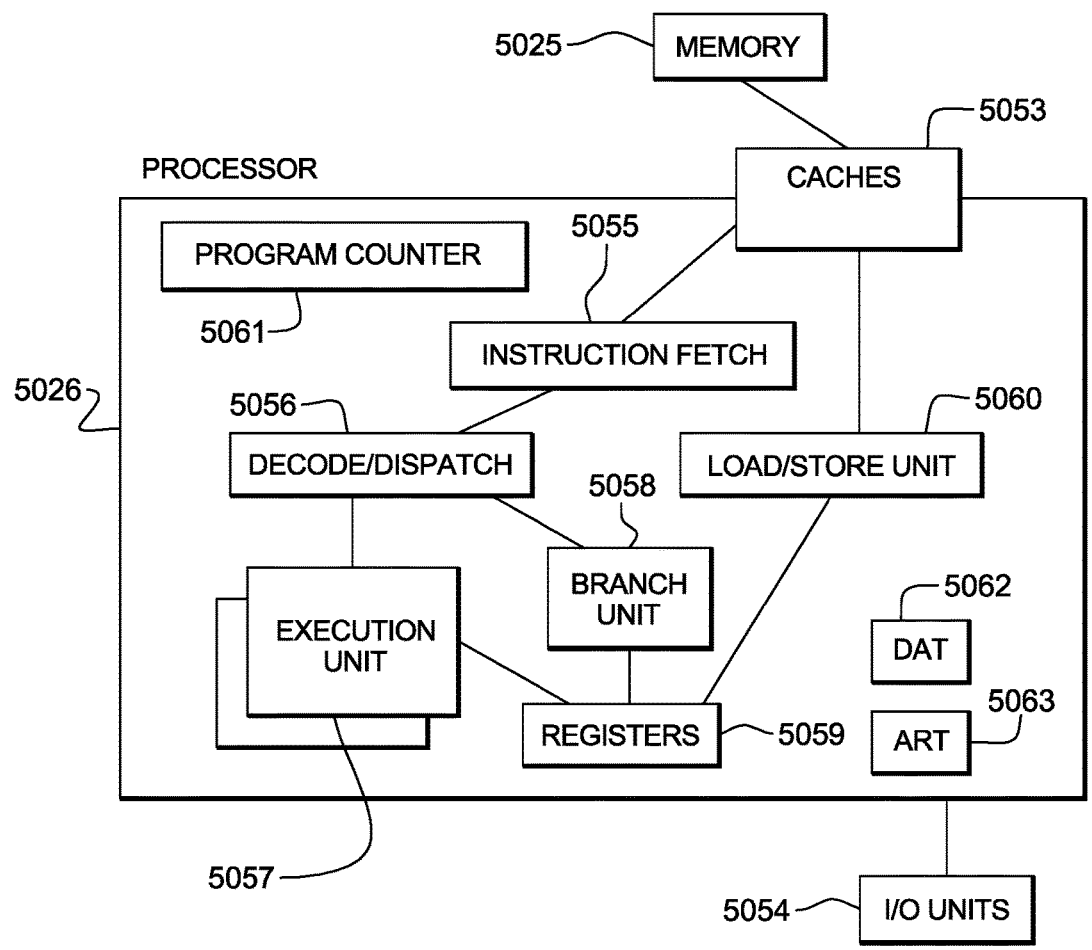
FIG. 2 depicts one embodiment of various elements of a computer system.

Referring to FIG. 2 depicts a processor 5026, which is an example of an embodiment of one or more of the central processors 110 (FIG. 1). FIG. 2 is utilized in the present invention to illustrate how prefetch data instructions may instruct a processor 5026 to perform a cache prefetch. Returning to FIG. 2, typically one or more levels of cache 5053 are employed to buffer memory blocks in order to improve processor performance. The cache 5053 is a high speed buffer holding cache lines of memory data that are likely to be used. Typical cache lines are 64, 128 or 256 bytes of memory data. Separate caches are often employed for caching instructions than for caching data. Cache coherence (synchronization of copies of lines in memory and the caches) is often provided by various "snoop" algorithms well known in the art. Main memory storage 5025 of a processor system is often referred to as a cache. In a processor system having 4 levels of cache 5053, main storage 5025 is sometimes referred to as the level 5 (L5) cache since it is typically faster and only holds a portion of the non-volatile storage (DASD, tape, etc.) that is available to a computer system. Main storage 5025 "caches" pages of data paged in and out of the main storage 5025 by the operating system.

A program counter (instruction counter) 5061 keeps track of the address of the current instruction to be executed. A program counter in a z/Architecture processor is 64 bits and can be truncated to 31 or 24 bits to support prior addressing limits. A program counter is typically embodied in a PSW (program status word) of a computer such that it persists during context switching. Thus, a program in progress, having a program counter value, may be interrupted by, for example, the operating system (context switch from the program environment to the operating system environment). The PSW of the program maintains the program counter value while the program is not active, and the program counter (in the PSW) of the operating system is used while the operating system is executing. Typically, the program counter is incremented by an amount equal to the number of bytes of the current instruction. RISC (Reduced Instruction Set Computing) instructions are typically fixed length while CISC (Complex Instruction Set Computing) instructions are typically variable length. Instructions of the IBM z/Architecture are CISC instructions having a length of 2, 4 or 6 bytes. The Program counter 5061 is modified by either a context switch operation or a branch taken operation of a branch instruction for example. In a context switch operation, the current program counter value is saved in the program status word along with other state information about the program being executed (such as condition codes), and a new program counter value is loaded pointing to an instruction of a new program module to be executed. A branch taken operation is performed in order to permit the program to make decisions or loop within the program by loading the result of the branch instruction into the program counter 5061.

Typically an instruction fetch unit 5055 is employed to fetch instructions on behalf of the processor 5026. The fetch unit either fetches "next sequential instructions," target instructions of branch taken instructions, or first instructions of a program following a context switch. In a computer system that utilizes aspects of some embodiments of the present invention, the instruction fetch units employ prefetch techniques to speculatively prefetch instructions based on the likelihood that the prefetched instructions might be used. For example, a fetch unit may fetch 16 bytes of instruction that includes the next sequential instruction and additional bytes of further sequential instructions.

The fetched instructions are then executed by the processor 5026. In an embodiment, the fetched instruction(s) are passed to a dispatch unit 5056 of the fetch unit. The dispatch unit decodes the instruction(s) and forwards information about the decoded instruction(s) to appropriate units 5057, 5058, 5060. An execution unit 5057 will typically receive information about decoded arithmetic instructions from the instruction fetch unit 5055 and will perform arithmetic operations on operands according to the opcode of the instruction. Operands are provided to the execution unit 5057 preferably either from memory 5025, architected registers 5059 or from an immediate field of the instruction being executed. Results of the execution, when stored, are stored either in memory 5025, registers 5059 or in other machine hardware (such as control registers, PSW registers and the like).

Virtual addresses are transformed into real addresses using dynamic address translation 5062 and, optionally, using access register translation 5063.

Figure 3A:
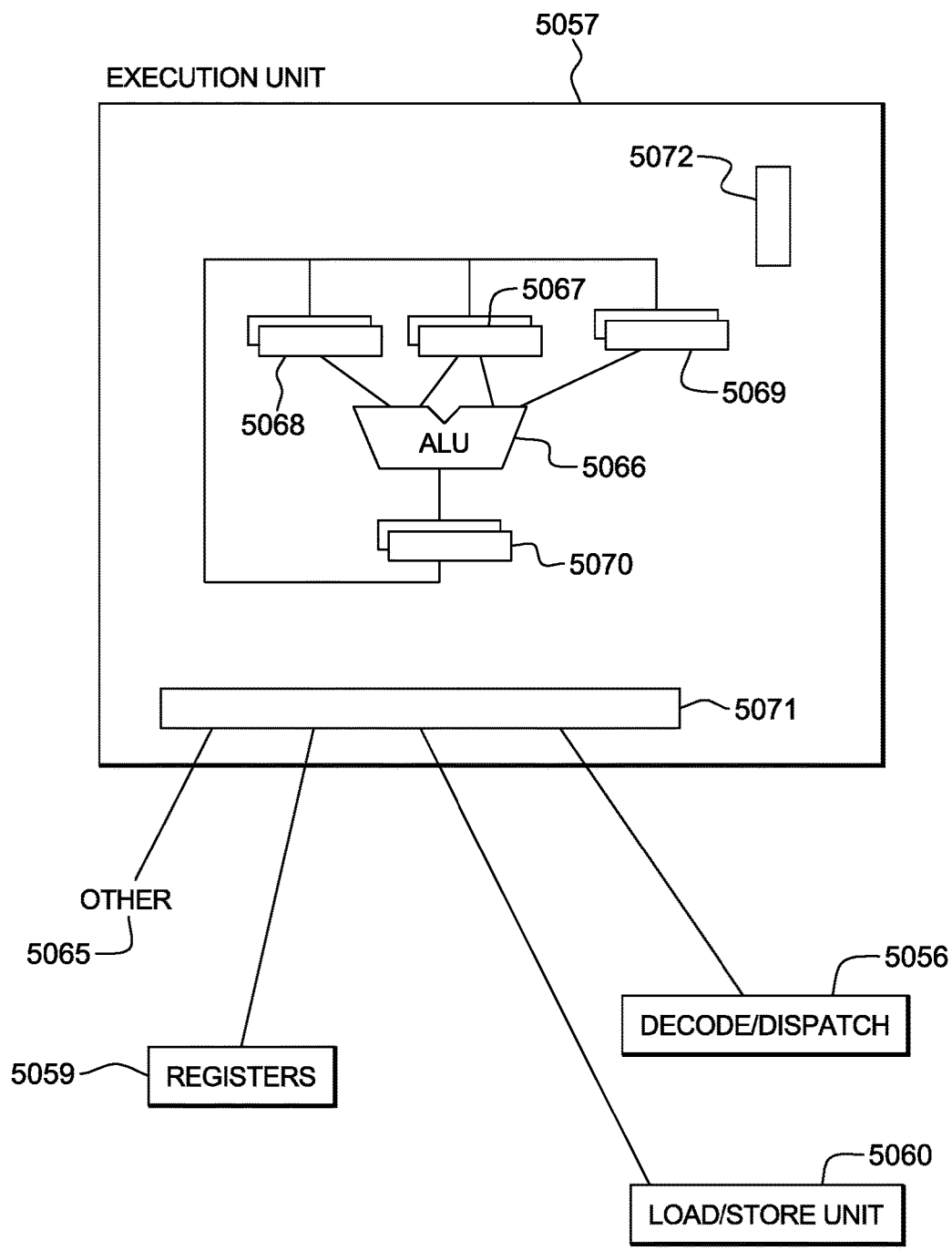
FIG. 3A depicts one embodiment of the execution unit of the computer system of FIG. 2.

A processor 5026 typically has one or more units 5057, 5058, 5060 for executing the function of the instruction. Referring to FIG. 3A, an execution unit 5057 may communicate 5071 with architected general registers 5059, a decode/dispatch unit 5056, a load store unit 5060, and other 5065 processor units by way of interfacing logic 5071. An execution unit 5057 may employ several register circuits 5067, 5068, 5069 to hold information that the arithmetic logic unit (ALU) 5066 will operate on. The ALU performs arithmetic operations such as add, subtract, multiply and divide as well as logical function such as and, or and exclusive-or (XOR), rotate and shift. Preferably the ALU supports specialized operations that are design dependent. Other circuits may provide other architected facilities 5072 including condition codes and recovery support logic for example. Typically the result of an ALU operation is held in an output register circuit 5070 which can forward the result to a variety of other processing functions. There are many arrangements of processor units, the present description is only intended to provide a representative understanding of one embodiment.

An ADD instruction for example would be executed in an execution unit 5057 having arithmetic and logical functionality while a floating point instruction for example would be executed in a floating point execution having specialized floating point capability. Preferably, an execution unit operates on operands identified by an instruction by performing an opcode defined function on the operands. For example, an ADD instruction may be executed by an execution unit 5057 on operands found in two registers 5059 identified by register fields of the instruction.

The execution unit 5057 performs the arithmetic addition on two operands and stores the result in a third operand where the third operand may be a third register or one of the two source registers. The execution unit preferably utilizes an Arithmetic Logic Unit (ALU) 5066 that is capable of performing a variety of logical functions such as Shift, Rotate, And, Or and XOR as well as a variety of algebraic functions including any of add, subtract, multiply, divide. Some ALUs 5066 are designed for scalar operations and some for floating point. Data may be Big Endian (where the least significant byte is at the highest byte address) or Little Endian (where the least significant byte is at the lowest byte address) depending on architecture. The IBM z/Architecture is Big Endian. Signed fields may be sign and magnitude, 1's complement or 2's complement depending on architecture. A 2's complement number is advantageous in that the ALU does not need to design a subtract capability since either a negative value or a positive value in 2's complement requires only an addition within the ALU. Numbers are commonly described in shorthand, where a 12 bit field defines an address of a 4,096 byte block and is commonly described as a 4 Kbyte (Kilo-byte) block, for example.

Figure 3B:
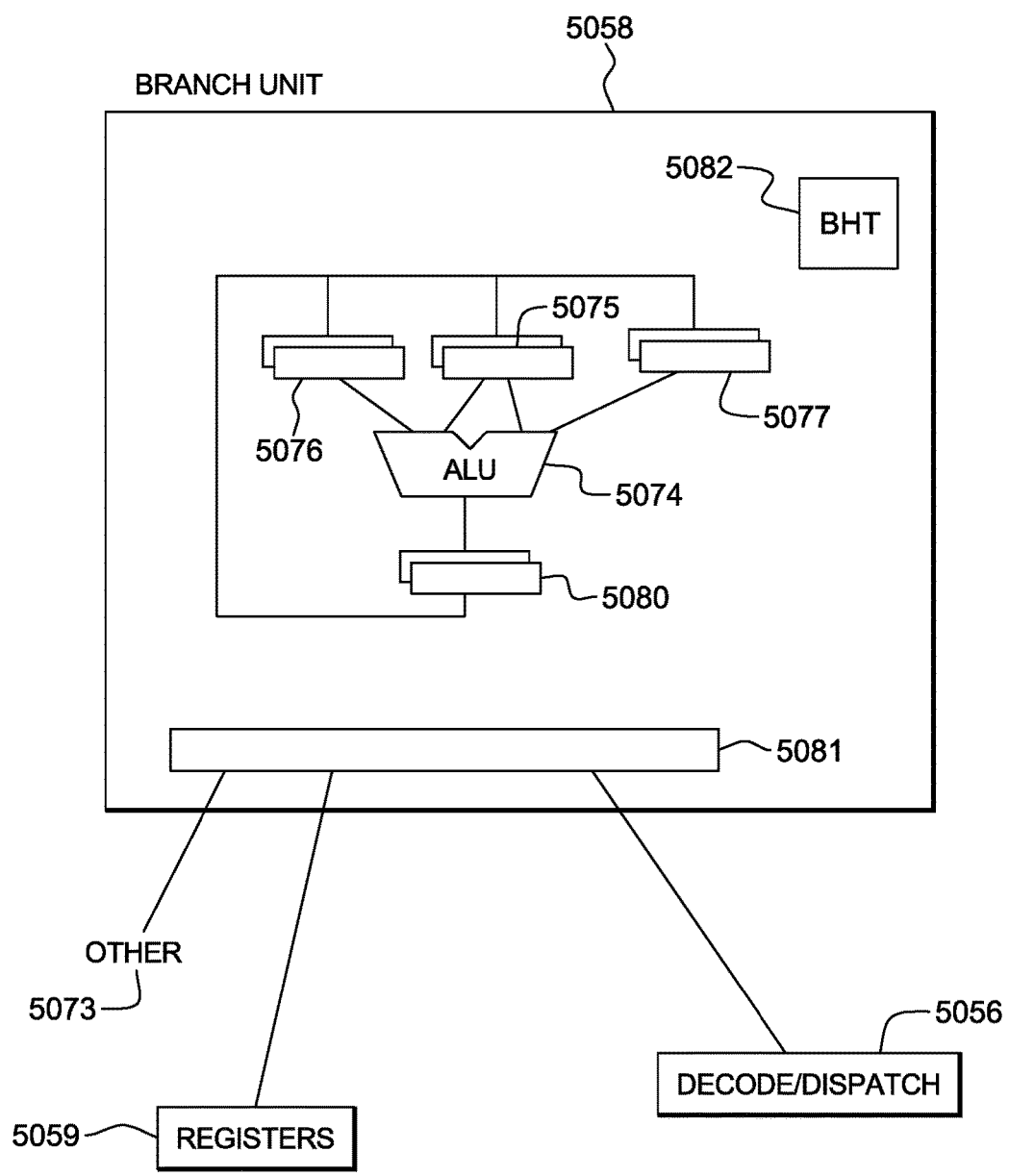
FIG. 3B depicts one embodiment of the branch unit of the computer system of FIG. 2.

Referring to FIG. 3B, branch instruction information for executing a branch instruction is typically sent to a branch unit 5058 which often employs a branch prediction algorithm such as a branch history table 5082 to predict the outcome of the branch before other conditional operations are complete. The target of the current branch instruction will be fetched and speculatively executed before the conditional operations are complete. When the conditional operations are completed the speculatively executed branch instructions are either completed or discarded based on the conditions of the conditional operation and the speculated outcome. A typical branch instruction may test condition codes and branch to a target address if the condition codes meet the branch requirement of the branch instruction, a target address may be calculated based on several numbers including ones found in register fields or an immediate field of the instruction for example. The branch unit 5058 may employ an ALU 5074 having a plurality of input register circuits 5075, 5076, 5077 and an output register circuit 5080. The branch unit 5058 may communicate 5081 with general registers 5059, decode dispatch unit 5056 or other circuits 5073, for example.

The execution of a group of instructions can be interrupted for a variety of reasons including a context switch initiated by an operating system, a program exception or error causing a context switch, an I/O interruption signal causing a context switch or multi-threading activity of a plurality of programs (in a multi-threaded environment), for example. Preferably a context switch action saves state information about a currently executing program and then loads state information about another program being invoked. State information may be saved in hardware registers or in memory for example. State information preferably comprises a program counter value pointing to a next instruction to be executed, condition codes, memory translation information and architected register content. A context switch activity can be exercised by hardware circuits, application programs, operating system programs or firmware code (microcode, pico-code or licensed internal code (LIC)) alone or in combination.

A processor accesses operands according to instruction defined methods. The instruction may provide an immediate operand using the value of a portion of the instruction, may provide one or more register fields explicitly pointing to either general purpose registers or special purpose registers (floating point registers for example). The instruction may utilize implied registers identified by an opcode field as operands. The instruction may utilize memory locations for operands. A memory location of an operand may be provided by a register, an immediate field, or a combination of registers and immediate field as exemplified by the z/Architecture long displacement facility wherein the instruction defines a base register, an index register and an immediate field (displacement field) that are added together to provide the address of the operand in memory for example. Location herein typically implies a location in main memory (main storage) unless otherwise indicated.

Figure 3C:
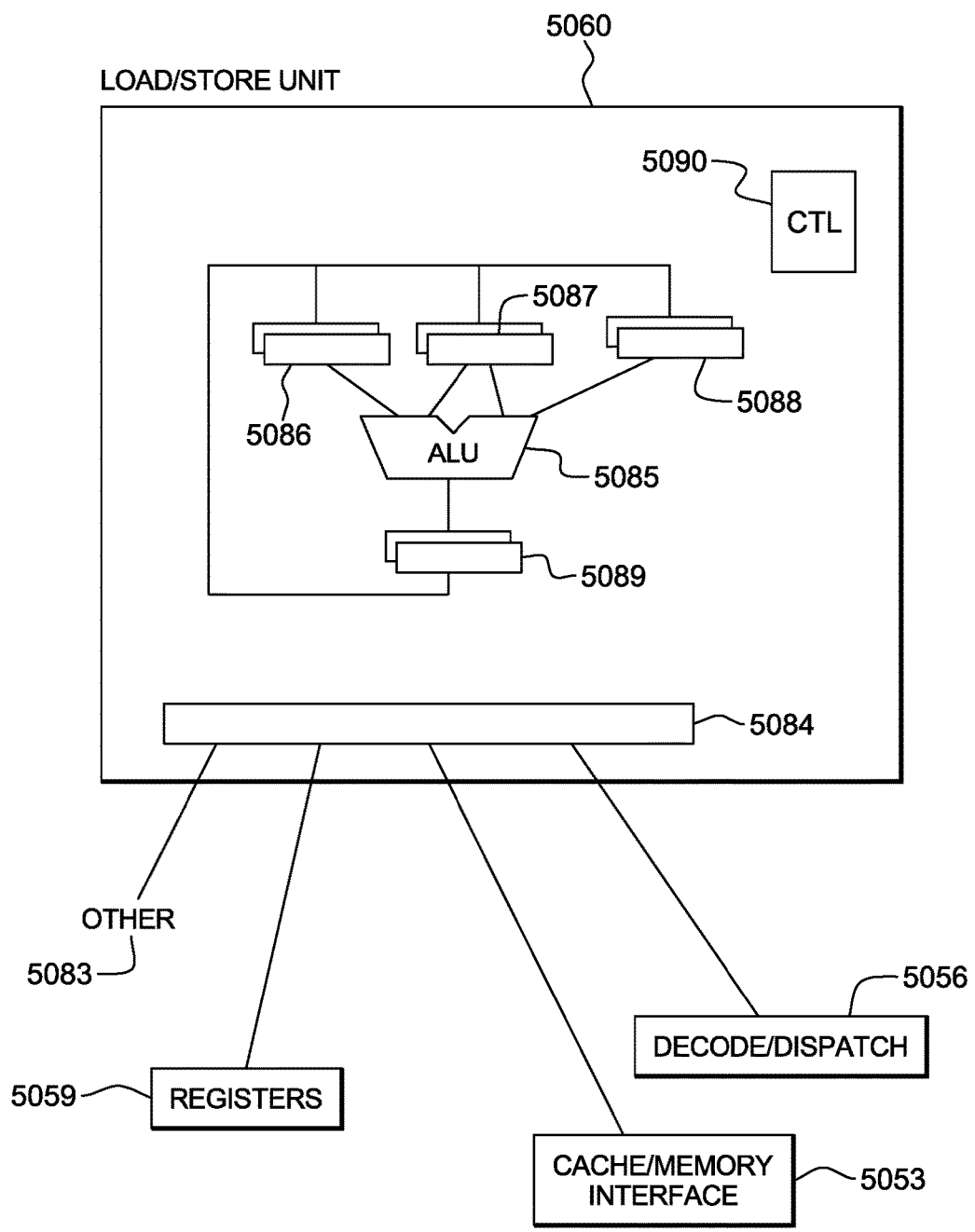
FIG. 3C depicts one embodiment of the load/store unit of the computer system of FIG. 2.

Referring to FIG. 3C, a processor accesses storage using a load/store unit 5060. The load/store unit 5060 may perform a load operation by obtaining the address of the target operand in memory 5053 and loading the operand in a register 5059 or another memory 5053 location, or may perform a store operation by obtaining the address of the target operand in memory 5053 and storing data obtained from a register 5059 or another memory 5053 location in the target operand location in memory 5053. The load/store unit 5060 may be speculative and may access memory in a sequence that is out-of-order relative to instruction sequence, however the load/store unit 5060 is to maintain the appearance to programs that instructions were executed in order. A load/store unit 5060 may communicate 5084 with general registers 5059, decode/dispatch unit 5056, cache/memory interface 5053 or other elements 5083 and comprises various register circuits 5086, 5087, 5088 and 5089, ALUs 5085 and control logic 5090 to calculate storage addresses and to provide pipeline sequencing to keep operations in-order. Some operations may be out of order but the load/store unit provides functionality to make the out of order operations to appear to the program as having been performed in order, as is well known in the art.

Preferably addresses that an application program "sees" are often referred to as virtual addresses. Virtual addresses are sometimes referred to as "logical addresses" and "effective addresses." These virtual addresses are virtual in that they are redirected to physical memory location by one of a variety of dynamic address translation (DAT) technologies including, but not limited to, simply prefixing a virtual address with an offset value, translating the virtual address via one or more translation tables, the translation tables preferably comprising at least a segment table and a page table alone or in combination, preferably, the segment table having an entry pointing to the page table. In the z/Architecture, a hierarchy of translation is provided including a region first table, a region second table, a region third table, a segment table and an optional page table. The performance of the address translation is often improved by utilizing a translation lookaside buffer (TLB) which comprises entries mapping a virtual address to an associated physical memory location. The entries are created when the DAT translates a virtual address using the translation tables. Subsequent use of the virtual address can then utilize the entry of the fast TLB rather than the slow sequential translation table accesses. TLB content may be managed by a variety of replacement algorithms including LRU (Least Recently used).

In the case where the processor is a processor of a multi-processor system, each processor has responsibility to keep shared resources, such as I/O, caches, TLBs and memory, interlocked for coherency. Typically, "snoop" technologies will be utilized in maintaining cache coherency. In a snoop environment, each cache line may be marked as being in any one of a shared state, an exclusive state, a changed state, an invalid state and the like in order to facilitate sharing.

I/O units 5054 (FIG. 2) provide the processor with means for attaching to peripheral devices including tape, disc, printers, displays, and networks for example. I/O units are often presented to the computer program by software drivers. In mainframes, such as the System z from IBM®, channel adapters and open system adapters are I/O units of the mainframe that provide the communications between the operating system and peripheral devices.

Further, other types of computing environments can benefit from one or more aspects. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more embodiments, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

More particularly, in a mainframe, architected machine instructions are used by programmers, usually today "C" programmers, often by way of a compiler application. These instructions stored in the storage medium may be executed natively in a z/Architecture IBM® Server, or alternatively in machines executing other architectures. They can be emulated in the existing and in future IBM® mainframe servers and on other machines of IBM® (e.g., Power Systems servers and System×Servers). They can be executed in machines running Linux on a wide variety of machines using hardware manufactured by IBM®, AMD, and others. Besides execution on that hardware under a z/Architecture, Linux can be used as well as machines which use emulation by Hercules, UMX, or FSI (Fundamental Software, Inc), where generally execution is in an emulation mode. In emulation mode, emulation software is executed by a native processor to emulate the architecture of an emulated processor.

The native processor typically executes emulation software comprising either firmware or a native operating system to perform emulation of the emulated processor. The emulation software is responsible for fetching and executing instructions of the emulated processor architecture. The emulation software maintains an emulated program counter to keep track of instruction boundaries. The emulation software may fetch one or more emulated machine instructions at a time and convert the one or more emulated machine instructions to a corresponding group of native machine instructions for execution by the native processor. These converted instructions may be cached such that a faster conversion can be accomplished. Notwithstanding, the emulation software is to maintain the architecture rules of the emulated processor architecture so as to assure operating systems and applications written for the emulated processor operate correctly. Furthermore, the emulation software is to provide resources identified by the emulated processor architecture including, but not limited to, control registers, general purpose registers, floating point registers, dynamic address translation function including segment tables and page tables for example, interrupt mechanisms, context switch mechanisms, Time of Day (TOD) clocks and architected interfaces to I/O subsystems such that an operating system or an application program designed to run on the emulated processor, can be run on the native processor having the emulation software.

A specific instruction being emulated is decoded, and a subroutine is called to perform the function of the individual instruction. An emulation software function emulating a function of an emulated processor is implemented, for example, in a "C" subroutine or driver, or some other method of providing a driver for the specific hardware as will be within the skill of those in the art.

In an embodiment of the present invention, program code executed by a processor, including a processor in a CPU of a computer system, including but not limited to the computer system of FIG. 1, tracks the elements (e.g., instructions, data, etc.) that the program code prefetches. For example, the program code that prefetches these elements may be part of an instruction fetch unit 5055 (FIG. 2) that fetches instructions on behalf of the processor 5026 (FIG. 2). The instruction fetch unit 5055 fetches instructions including next sequential instructions, target instructions of branch taken instructions, and/or first instructions of a program following a context switch. The instruction fetch unit 5055 may also employ prefetch techniques to prefetch instructions and/or data elements, for example, based on the likelihood that the prefetched elements might be used. Instructions issued by program code in sequence may be referred to as demand instructions, while instructions issues by the program code to gather elements in advance of when they are needed, for example, based on the likelihood that the prefetched elements might be used, may be referred to as prefetch instructions. Examples of prefetch instructions include the Prefetch Data (PFD) and Prefetch Data Relative Long (PFDRL) instructions, as defined in the z/Architecture offered by International Business Machines Corporation, Armonk, N.Y. Embodiments of the present invention enhance the functionality of these pre-existing prefetch instructions by providing the sequencing described herein.

The size of the elements fetched by an instruction fetch unit 5055 is limited by the size of the cache in which the elements, including the prefetched elements, can be stored. For example, in an example computer architecture, a fetch unit may fetch 16 bytes of instruction that includes the next sequential instruction and additional bytes of further sequential instructions (e.g., prefetched elements). Thus, if prefetched elements are not ultimately utilized, fetching them was both ineffective and inefficient.

In order to increase the efficiency of a given system, in an embodiment of the present invention, program code monitors the usage of the prefetched elements by one or more processor of a CPU. For example, in an embodiment of the present invention, if the program code determines that a prefetched element has not been used (e.g., used by an instruction, program code executed by the processor), the program code marks the element (e.g., the fetched data and/or instruction) as ineffective. In an embodiment of the present invention, the program code marks the prefetch element as ineffective in a data structure.

In an embodiment of the present invention, the data structure the program code utilizes to track whether prefetching certain elements is effective is indexed by instruction address. In an embodiment of the present invention, the data structure is a dedicated data structure. In an embodiment of the present invention, the data structure is shared with other structures that track instruction properties, including but not limited to, the branch prediction and/or Operand Store Compare (OSC) prediction logic.

FIG. 4 illustrates a workflow 400 of an embodiment of the present invention. In an embodiment of the present invention, program code issues a prefetch instruction (410). Based on the prefetch instruction, the program code obtains element(s) from a memory or a higher level cache and stores the elements in temporary storage (420). The program code stores a record representing the prefetch instruction (430).

The record representing the prefetch instruction may be the instruction and/or the element(s) fetched as a result of the instruction. In an embodiment of the present invention, the record is indexed so that it can be accessed easily moving forward. In one example, the program code indexes the record by instruction address. In an embodiment of the present invention, the program code may store the record concurrently with issuing the prefetch instruction and/or concurrently with obtaining element(s) from memory to store in the temporary storage.

In an embodiment of the present invention, the program code stores the record representing the prefetch instruction in a data structure. Depending upon the embodiment of the present invention, the data structure can be a dedicated data structure or it can be shared with other structures that track instruction properties, including but not limited to, branch prediction and/or OSC prediction logic.

Returning to FIG. 4, in an embodiment of the present invention, the program code monitors the elements in the temporary storage (440). Based on the temporary storage losing the prefetched element(s) that the program code fetched based on the prefetch instruction, before the element(s) is/are accessed by a demand instruction, the program code marks the record representing the prefetch instruction with an indicator (450). In an embodiment of the present invention, the indicator indicates that the prefetch instruction associated with the identifier in ineffective. As understood by one of skill in the art, a prefetch instruction is ineffective when it causes a computer system to store data in temporary storage that is not later utilized from the temporary storage by instructions that are executed by a processor 5026 (e.g., FIG. 2) in a computing environment 100 (e.g., FIG. 1).

In an embodiment of the present invention, rather than continuously monitor the prefetched element(s) in the temporary storage, the program code obtains an indicator when an element leaves the temporary storage without being utilized by an instruction. In an embodiment of the present invention, the program code obtains an indicator when an element leaves the temporary storage and checks to determine whether the elements was utilized by an instruction before leaving the temporary storage. However, based on an element leaving the temporary storage before it is accessed by an instruction, the program code updates the record related to the prefetch instruction that fetched the unused element with an indicator (e.g., 450).

Returning to FIG. 4, in an embodiment of the present invention, the program code issues a new prefetch instruction (e.g., to the caches) and compares the new prefetch instruction to the record of the prefetch instruction (460). Based on the new prefetch instruction matching the prefetch instruction, the program code assigns the indicator to the new prefetch instruction (470). By associating an indicator with the new fetch instruction, the program code has indicated whether prefetching the given instruction is effective. The program code can utilize this indication to prioritize the new prefetch instruction, including determining when to execute the new prefetch instruction when compared to other instructions that may be executed at a similar time.

Certain aspects of some embodiments of the present invention can provide additional information regarding whether performing a given prefetch is effective, including more granular information that indicates how far in advance of actual use by a demand instruction the program code prefetched the elements required by this instruction. As aforementioned, the space in a cache can be limited and it is inefficient for a processor to issue prefetch instructions that result in storing elements that are not utilized for long periods of time in place of those that are utilized quickly. Thus, greater granularity can assist the program code in prioritizing various prefetch instructions issued, in a given computing environment.

FIG. 5 is an example of a workflow 500 where the program code obtains and retains this more granular information about the prefetch instruction that the program code issues, so that the program code can execute prefetch instructions that are more effective in place of and/or before it executes prefetch instructions that are less effective. Embodiments of the present invention with aspects illustrated in FIG. 5 provide granular information including, but not limited to, how long before a demand usage the program code issued the prefetch instruction to obtain the element(s) utilized by the demand usage.

Referring to FIG. 5, program code issues a prefetch instruction (510). Based on the instruction, the program code obtains element(s) from a memory or a higher level cache and stores the elements, for example, in temporary storage (520). The program code obtains and stores a record related to the prefetch instruction (530). In this embodiment of the present invention, the record may include the instruction and includes a fetch operand address (i.e., the prefetch instruction address).

In an embodiment of the present invention, for prefetch each instruction retained in a record, the program code maintains both the fetch operand address and the number of cycles since the program code issued the prefetch instruction. In an embodiment of the present invention, the program code maintains the address and the number of cycles in a data structure; this data structure may be the same data structure in which the program code maintains the record related to the prefetch instruction, or it may be a separate data structure. However, whether the data structure is independent or shared, in this data structure, in certain embodiments of the present invention, the program code maintains a past predefined number of prefetches (e.g., N prefetches) together with the number of cycles since each prefetch was launched (i.e., the program code issued the prefetch instruction). As explained below, the program code can later reference the number of cycles related to a record to prioritize new prefetch instructions issued by the program code.

Returning to FIG. 5, the program code monitors the elements in the temporary storage, which includes counting and retaining the number of cycles since the program code issued the prefetch instruction and updating the record with the number of cycles (540). The program code obtains a demand fetch and determines whether the demand fetch will utilize the elements fetched based on the prefetch instruction. To make this determination, in an embodiment of the present invention, the program code compares the demand fetch instruction to the prefetch instruction to determine if the instructions have the same operand address (550). Based on determining that the demand fetch instruction and the prefetch instruction have the same operand address, the program code updates the record related to the prefetch instruction (560).

In an embodiment of the present invention, the program code updates the record by removing the record from a first data structure and storing the record in a second data structure. The program code stores in the second data structure both the identifier and the number of cycles, which is the number of cycles from when the program code issued the fetch instruction to when the demand fetch instruction utilized the prefetched element(s). A lower number of cycles indicates that the prefetched elements related to this record were utilized more quickly by an instruction. Thus, the prefetched instructions associated with lower numbers of cycles are those that are more effective.

Returning to FIG. 5, in an embodiment of the present invention, the program code issues a new prefetch instruction (e.g., to the caches) and compares the new prefetch instruction to the updated record (570). The program code assigns the new prefetch instruction a priority (580). In an embodiment of the present invention, if the new prefetch instruction matches the prefetch instruction in the record, the program code assigns the new prefetch instruction a priority related to the number of cycles in the updated record. If the new prefetch instruction does not match the prefetch instruction in the record, the program code assigns the new prefetch instruction a priority a priority representing a default effectiveness. By associating a priority with the new fetch instruction, the program code has indicated a measure of how effective the new fetch instruction is.

The program code can utilize this priority to prioritize execution of the new prefetch instruction by the resources of the computing environment. For example, in an embodiment of the present invention, when the new prefetch instruction is issued, the program code checks all fetch control machines to see if a machine is available to perform the prefetch. Based on determining that all fetch control machines are busy, the program code compares the priority of the new prefetch instruction with the priorities of the prior prefetches that are busying the fetch controllers. If the prefetch instructions being executed are of a lower priority than the new prefect instruction, the program code can cancel the least effective, i.e., the lowest priority, prefetch (e.g., cancel the state machine), and launch the new prefetch instruction (e.g., to the nest).

The program code may also utilize the priority of a prefetch instruction, which represents the effectiveness of the prefetch instruction, in a nest to control priority of data transfers, queuing priority, etc.

Figure 9A:
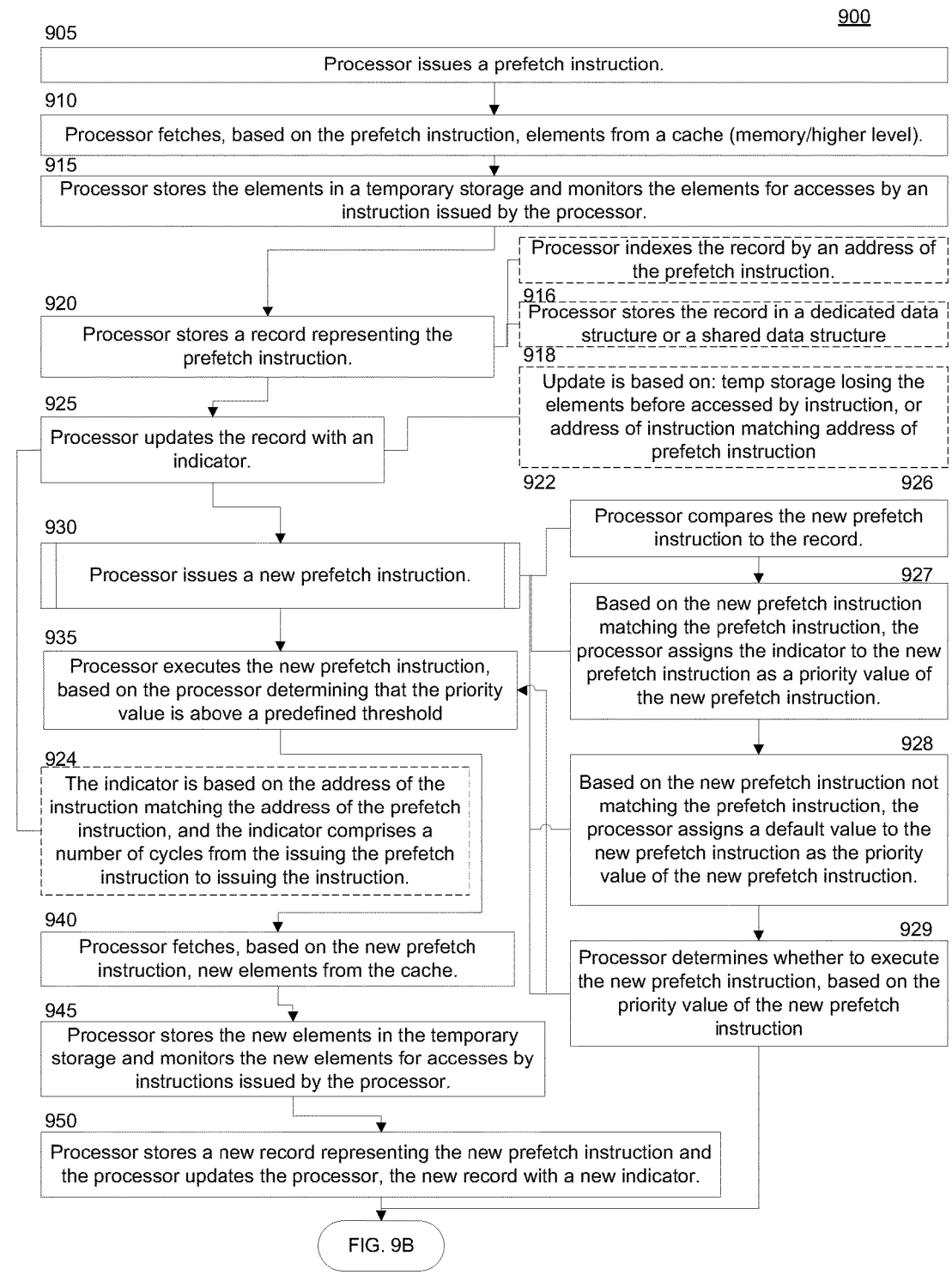
FIG. 9A and FIG. 9B depict a workflow diagram illustrating aspects of the present technique.
Figure 9B:
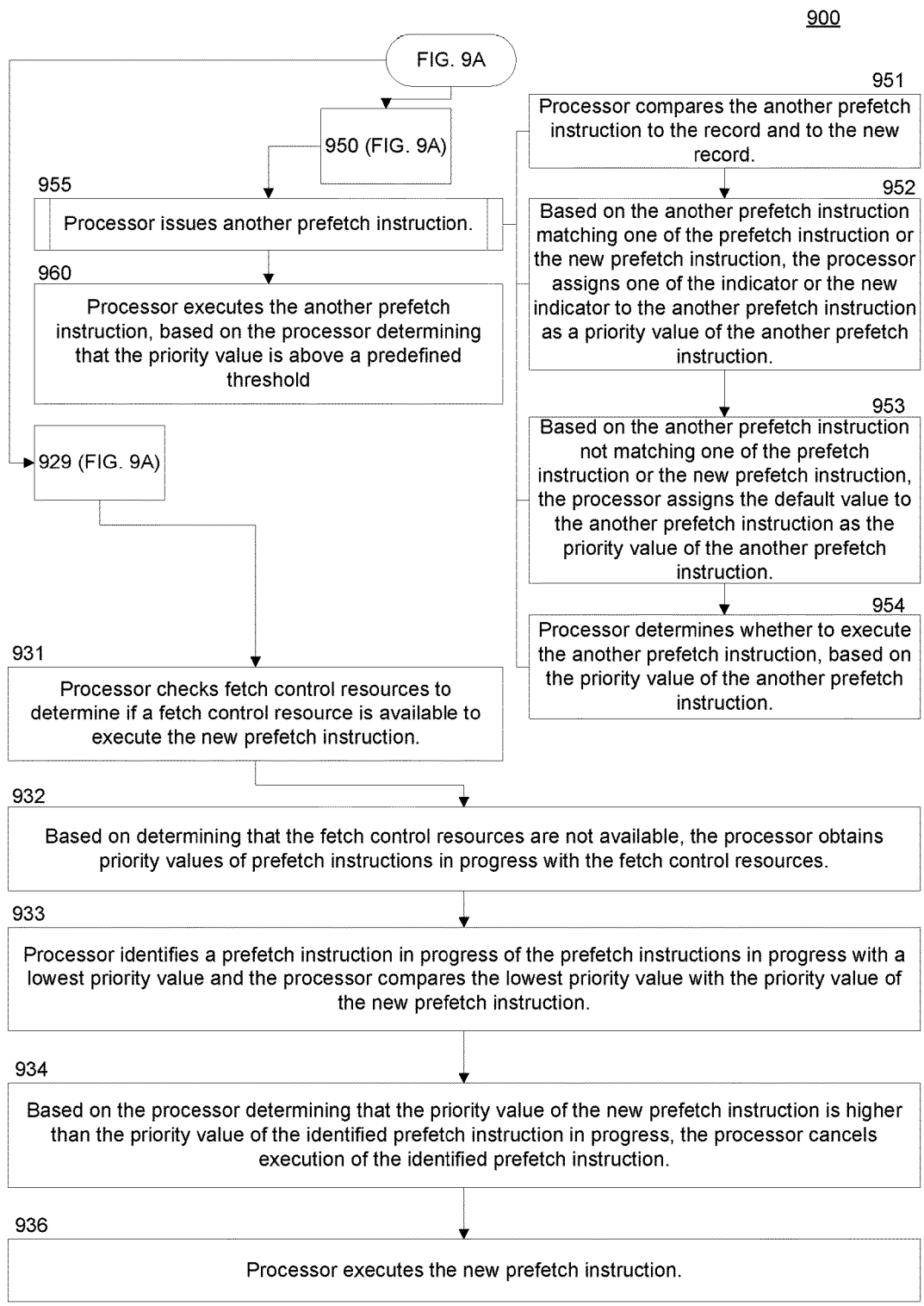

FIG. 9A and FIG. 9B are a workflow 900 that illustrates aspects of some embodiments of the present invention. In an embodiment of the present invention, a processor issues a prefetch instruction (905). The processor fetches, based on the prefetch instruction, elements from a cache, wherein the cache may include a memory or a higher level cache (910). The processor stores the elements in a temporary storage and monitors the elements for accesses by an instruction issued by the processor (915). The processor stores a record representing the prefetch instruction (920). In an embodiment of the present invention, when the processor stores the record representing the prefetch instruction, the processor indexes the record by an address of the prefetch instruction (916). In an embodiment of the present invention, the processor stores the record in a data structure where the data structure is one of: a dedicated data structure or a shared data structure (918).

The processor updates the record with an indicator (925). In an embodiment of the present invention, the processor updates the record based on one of: the temporary storage losing the elements before the elements are accessed by the instruction, or an address of the instruction matching an address of the prefetch instruction (922). In an embodiment of the present invention, the indicator is based on the address of the instruction matching the address of the prefetch instruction, and the indicator comprises a number of cycles from the issuing the prefetch instruction to issuing the instruction (924).

The processor issues a new prefetch instruction (930), where the issuing includes the following: the processor compares the new prefetch instruction to the record (926); based on the new prefetch instruction matching the prefetch instruction, the processor assigns the indicator to the new prefetch instruction as a priority value of the new prefetch instruction (927); based on the new prefetch instruction not matching the prefetch instruction, the processor assigns a default value to the new prefetch instruction as the priority value of the new prefetch instruction (928); and the processor determines whether to execute the new prefetch instruction, based on the priority value of the new prefetch instruction (929).

As aforementioned, in an embodiment of the present invention, the processor determines whether to execute the new prefetch instruction, based on the priority value of the new prefetch instruction. In this determination, in an embodiment of the present invention, the processor checks fetch control resources to determine if a fetch control resource is available to execute the new prefetch instruction (931). Based on determining that the fetch control resources are not available, the processor obtains priority values of prefetch instructions in progress with the fetch control resources (932). The processor identifies a prefetch instruction in progress of the prefetch instructions in progress with a lowest priority value and the processor compares the lowest priority value with the priority value of the new prefetch instruction (933). Based on the processor determining that the priority value of the new prefetch instruction is higher than the priority value of the identified prefetch instruction in progress, the processor cancels execution of the identified prefetch instruction (934). The processor executes the new prefetch instruction (936).

In an embodiment of the present invention, the processor executes the new prefetch instruction, based on the determining indicating that the priority value is above a predefined threshold (935).

In an embodiment of the present invention, the processor fetches, based on the new prefetch instruction, new elements from the cache (940). In this embodiment, the processor stores the new elements in the temporary storage and monitors the new elements for accesses by instructions issued by the processor (945). The processor also stores a new record representing the new prefetch instruction and the processor updates the processor, the new record with a new indicator (950). In a further embodiment of the present invention, the new indicator may be based on one of: the temporary storage losing the new elements before the elements are accessed by at least one instruction, or an address of at least one instruction matching an address of the prefetch instruction (948).

In another embodiment of the present invention, the processor issues another prefetch instruction (955). In issuing the instruction, the processor compares the other prefetch instruction to the record and to the new record (951), based on the other prefetch instruction matching one of the prefetch instruction or the new prefetch instruction, the processor assigns one of the indicator or the new indicator to the other prefetch instruction as a priority value of the other prefetch instruction (952), based on the other prefetch instruction not matching one of the prefetch instruction or the new prefetch instruction, the processor assigns the default value to the other prefetch instruction as the priority value of the other prefetch instruction (953), and the processor determines whether to execute the other prefetch instruction, based on the priority value of the other prefetch instruction (954).

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 6:
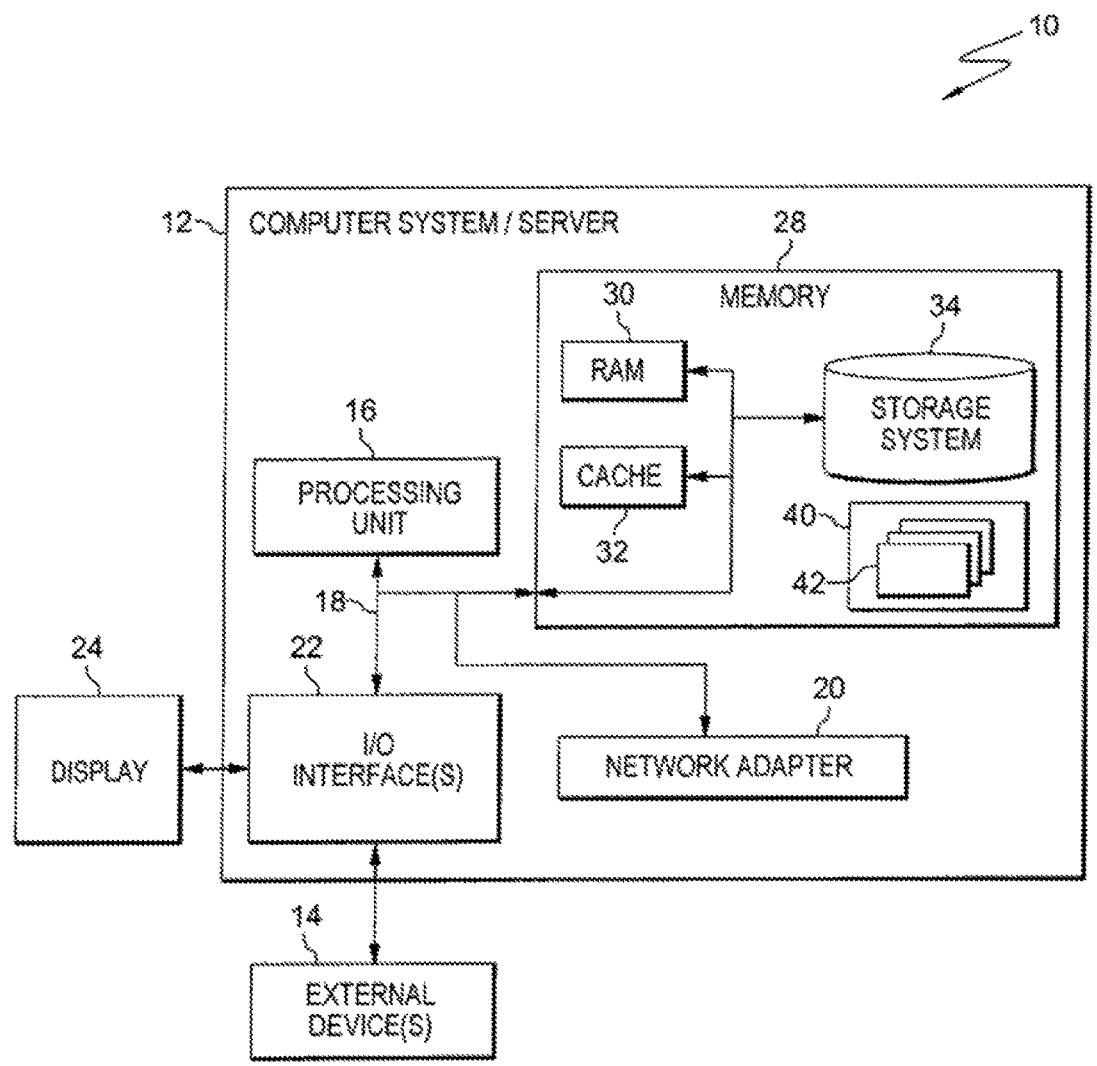
FIG. 6 is a workflow diagram depicting aspects of the present technique.

Referring now to FIG. 6, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 7:
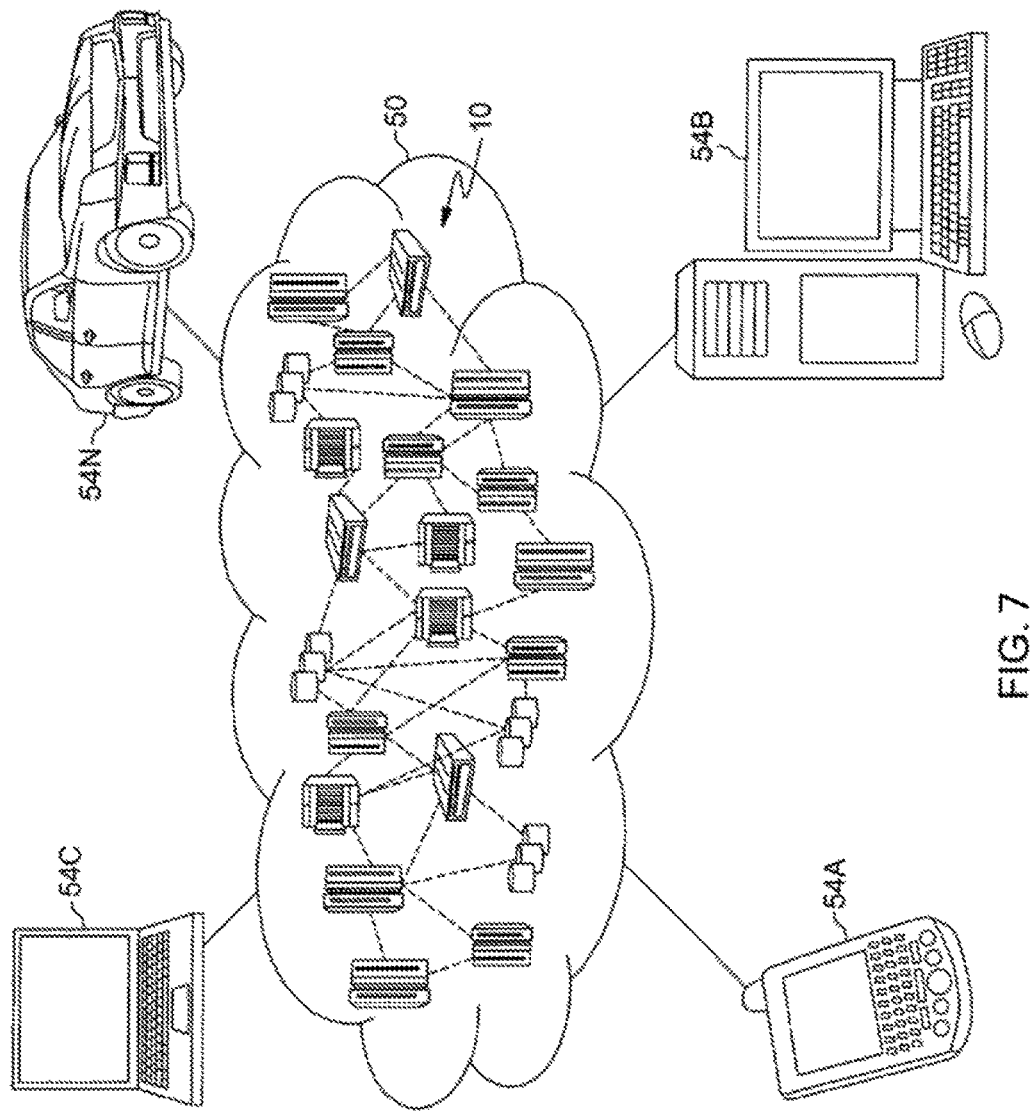
FIG. 7 depicts one embodiment of a cloud computing environment.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
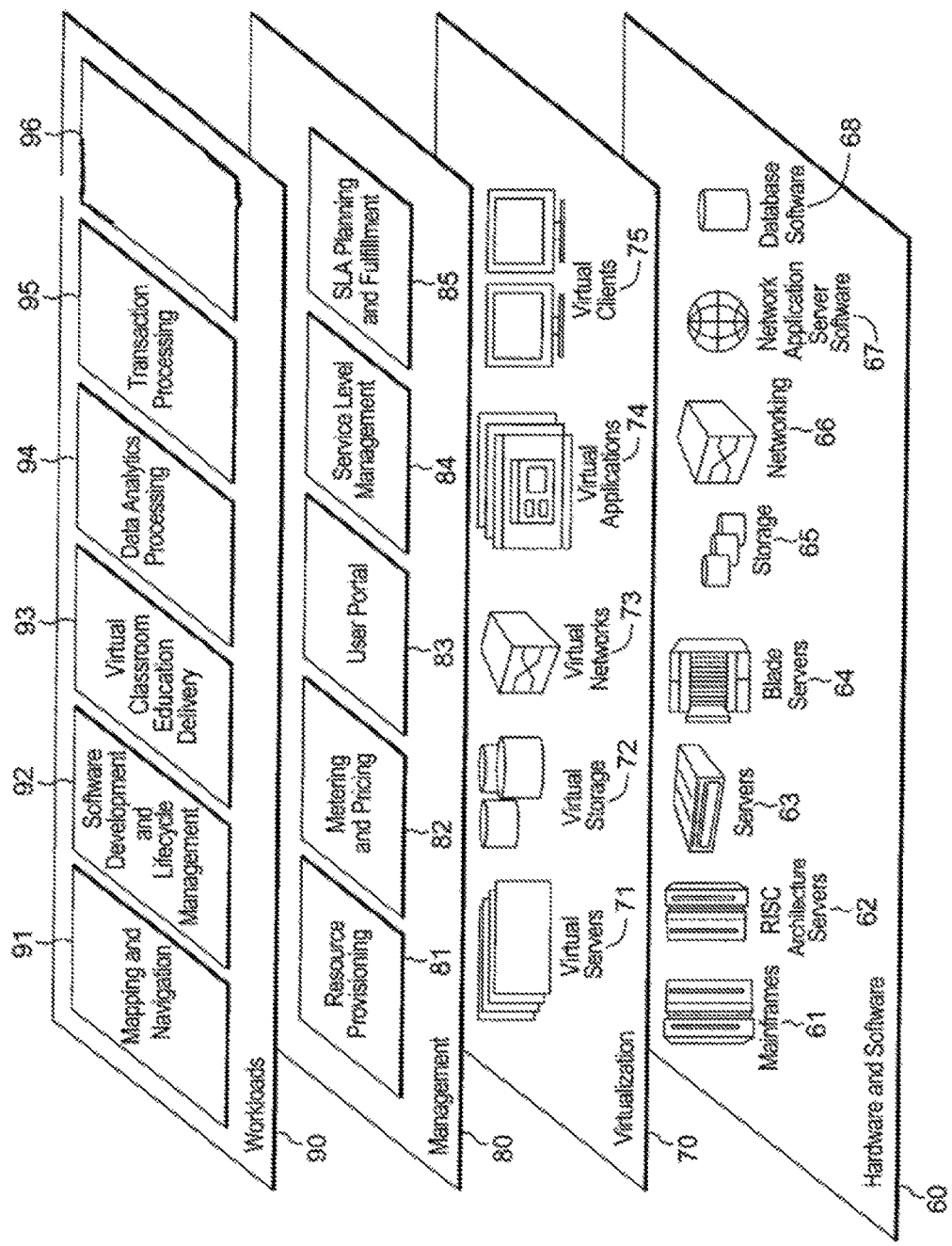
FIG. 8 depicts one example of abstraction model layers.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below, which may include maintaining VPD at a VPD location the computer system. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and monitoring the effectiveness of prefetches.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
   issuing, by a processor, a prefetch instruction;
   fetching, by the processor, based on the prefetch instruction, elements from a cache, wherein the cache comprises a memory or a higher level cache;
   storing, by the processor, the elements in a temporary storage and monitoring the elements for accesses by an instruction issued by the processor;
   storing, by the processor, in a shared data structure, a record representing the prefetch instruction, wherein the data structure is shared with another structure that tracks instruction properties, wherein the other data structure is selected from the group consisting of: branch prediction logic and operand store compare prediction logic;
   updating, by the processor, the record of the prefetch instruction with an indicator, wherein the indicator is a priority value of the prefetch instruction, wherein the indicator is selected from the group consisting of: a value representing a number of cycles from issuing the prefetch instruction to the instruction utilizing the elements in the temporary storage, by the instruction, and a value representing that the prefetch instruction is ineffective based on the temporary storage having lost the elements before the elements were utilized by the instruction; and
   issuing, by the processor, a new prefetch instruction, wherein the issuing comprises:
      comparing, by the processor, the new prefetch instruction to the record;
      based on the new prefetch instruction matching the prefetch instruction, assigning, by the processor, the indicator to the new prefetch instruction as a priority value of the new prefetch instruction;
      based on the new prefetch instruction not matching the prefetch instruction, assigning, by the processor, a default value to the new prefetch instruction as the priority value of the new prefetch instruction, wherein the default value indicates a higher priority than the indicator; and
      determining, by the processor, whether to execute the new prefetch instruction, based on the priority value of the new prefetch instruction.

2. The computer-implemented method of claim 1, further comprising:
   executing, by the processor, the new prefetch instruction, based on the determining indicating that the priority value is above a predefined threshold.

3. The computer-implemented method of claim 1, the storing the record representing the prefetch instruction further comprising:
  indexing, by the processor, the record by an address of the prefetch instruction.

4. The computer-implemented method of claim 1, the determining whether to execute the new prefetch instruction, based on the priority value of the new prefetch instruction, further comprises:
  checking, by the processor, fetch control resources to determine if a fetch control resource is available to execute the new prefetch instruction;
  based on determining that the fetch control resources are not available, obtaining priority values of prefetch instructions in progress with the fetch control resources;
  identifying, by the processor, a prefetch instruction in progress of the prefetch instructions in progress with a lowest priority value and comparing the lowest priority value with the priority value of the new prefetch instruction;
  based on determining, by the processor, that the priority value of the new prefetch instruction is higher than the priority value of the identified prefetch instruction in progress, cancelling, by the processor, execution of the identified prefetch instruction; and
  determining, by the processor, whether to execute the new prefetch instruction, based on the priority value of the new prefetch instruction.

5. The computer-implemented method of claim 1, further comprising:
  fetching, by the processor, based on the new prefetch instruction, new elements from the cache;
  storing, by the processor, the new elements in the temporary storage and monitoring the new elements for accesses by instructions issued by the processor;
  storing, by the processor, a new record representing the new prefetch instruction; and
  updating, by the processor, the new record with a new indicator.

6. The computer-implemented method of claim 5, wherein the new indicator is based on the temporary storage losing the new elements before the elements are accessed by a demand fetch instruction executed by the processor.

7. The computer-implemented method of claim 6, further comprising:
  issuing, by the processor, another prefetch instruction, wherein the issuing comprises:
    comparing, by the processor, the other prefetch instruction to the record and to the new record;
    based on the other prefetch instruction matching one of the prefetch instruction or the new prefetch instruction, assigning, by the processor, one of the indicator or the new indicator to the other prefetch instruction as a priority value of the other prefetch instruction;
    based on the other prefetch instruction not matching one of the prefetch instruction or the new prefetch instruction, assigning, by the processor, the default value to the other prefetch instruction as the priority value of the other prefetch instruction; and
    determining, by the processor, whether to execute the other prefetch instruction, based on the priority value of the other prefetch instruction.

* * * * *